United States Patent

[11] 3,584,535

| [72] | Inventor | Franz Rossberger<br>Munich, Germany |
|---|---|---|
| [21] | Appl. No. | 850,497 |
| [22] | Filed | Aug. 15, 1969 |
| [45] | Patented | June 15, 1971 |
| [73] | Assignee | Friedrich Deckel Prazisions Mechanik &<br>Maschinenbau<br>Munich, Germany |
| [32] | Priority | Aug. 19, 1968 |
| [33] | | Austria |
| [31] | | A 8075/68 |

[54] ATTACHMENT FOR A DUPLICATING MILLING MACHINE
10 Claims, 3 Drawing Figs.

[52] U.S. Cl. .................................................. 90/13.1,
33/25
[51] Int. Cl. .................................................... B23c 1/16,
B43l 13/10
[50] Field of Search .......................................... 90/13.1, 13,
62; 33/25 R, 25 B

[56] References Cited
UNITED STATES PATENTS

| 2,161,709 | 6/1939 | Henkes.......................... | 90/13.1 |
| 2,176,193 | 10/1939 | Zwick........................... | 90/13.1 |

*Primary Examiner*—Gil Weidenfeld
*Attorney*—Brady, O'Boyle & Gates

ABSTRACT: A cantilevered arm attachment for the tracing stylus bushing of a duplicating milling machine, with a tracing stylus adapted to move axially in one coordinate direction as it traces over the contoured surface of a three-dimensional pattern and pivot a lever arm to transfer the axial dimension movements in a selected reduction ration to the tracing stylus bushing and the cutting tool which is guided by it, by means of a cantilevered arm to which the lever arm is pivoted, whereby the tool cuts in a workpiece a relief style transformation of an ordinary three-dimensional pattern, which has dimensions in one coordinate direction, such as the vertical dimensions, which are greatly reduced from the corresponding dimensions of the pattern while the transfer of dimensions in the other coordinate directions are uneffected by the attachment.

INVENTOR
FRANZ ROSSBERGER

3,584,535

ATTACHMENT FOR A DUPLICATING MILLING MACHINE

BACKGROUND OF THE INVENTION

The invention relates broadly to a profiling machine such as one operated by a pantograph; and more particularly to a duplicating milling machine with a cutting tool guided by a pattern tracer or tracing stylus which is guided in its bearing on the duplicating machine in an axially displaceable manner. The axis of the cutting tool extends preferably in parallel with respect to the tracing stylus axis in the usual manner. Duplicating milling machines of this general type are known in the art, wherein the pattern tracing stylus and the tool are not rigidly connected with respect to each other in the direction of the tracer axis or the tool axis, but are connected by means of a gear so that one can move axially relative to the other. In these machines, the transmission ratio of the relative motions of the tool with respect to the workpiece and of the tracer with respect to the pattern in the direction of the tracer axis or the tool axis, respectively, that is movement in the vertical direction, is different from the transmission ratio of these relative motions in the planes that are normal with respect to the tracer axis. The above-mentioned gear, in the conventional machines, includes threaded spindles which when rotated axially displace the tracer or the tool, with the threaded spindles of the tracer and the cutting tool connected with each other by means of a gear transmission. In the planes that are normal with respect to the tracer axis, the transmission ratio of the movements of the tracer and of the cutting tool is 1:1, i.e., the movements of the tracer and of the tool are of the same magnitude and the cutting tool follows the movements of the tracing stylus.

The invention is based on the problem of providing a device which will produce reliefs in a plane workpiece surface from and in accordance with three-dimensional patterns, which device provides a reduction in one of the three space coordinates, such as the vertical or Y coordinate, and which device can be employed in connection with existing profiling machines of all types, i.e., also those wherein it is possible to set, with respect to the tracer and cutting tool, a transmission ratio deviating from 1:1 in all three coordinates.

SUMMARY OF THE INVENTION

The copying machine attachment of the invention which enables an ordinary copying machine to take a three-dimensional pattern or model and produce from it a relief that is proportional to the model but the vertical coordinate dimensions shortened or reduced by a selected amount from the corresponding vertical dimensions of the pattern, includes a pattern tracing stylus that is axially movable in the vertical coordinate direction in the tracing stylus bushing provided on the duplicating machine. A cantilevered or overhung arm member is connected at one end to the tracer bushing by the movable tracing stylus acting as a pin connector. A pivot bearing member depends from the cantilevered arm and is movable to several alternately selectable positions along the bottom of the arm which are predetermined at varying distances therealong to vary the reduction ratio of one of the coordinate dimensions, such as the vertical axis dimensions, as they are transferred from the pattern to the workpiece.

A lever arm is positioned beneath the cantilevered arm and is pivotally connected at one end to the tracing stylus while the opposite end is guided in a horizontal plane that is normal to axis of the tracing stylus and which plane is disposed at a nonvariable distance or predetermined fixed position relative to the pattern on the pattern holding table. The horizontal guiding plane may be in the form of a rail connected to the pattern holding table, in which case the guided end of the lever arm is provided with a roller journaled thereto and which engages and guidingly rolls along the rail. With this construction the cantilevered arm can be pivoted about the tracer axis, so that the tracing stylus bushing can be moved in all directions.

The medial portion of the lever arm is provided with several alternately usable pivot points at varying distances along the length thereof which correspond with and are respectively usable with the alternate positions of the pivot bearing member on the cantilevered arm. In any selected position the pivot bearing on the cantilevered arm engages the corresponding pivot point on the lever arm and forms a fulcrum for the lever arm between the tracer and roller. As the pivot bearing is moved along the cantilevered arm the fulcrum of the lever arm is shifted, thus changing the ratio of vertical movement of the tracing stylus to vertical movement transferred therefrom through the lever arm and cantilevered arm to the tracer bushing and thus the cutting tool on the pantograph or other mechanism.

A device of this type is particularly well adapted for being attached to existing profiling copy machines of all types. The machines are already adapted to produce true-to-scale copying of three-dimensional patterns on a 1:1 scale, as well as producing copies which are enlargements or reductions deviating from this scale. Now with the attachment of the present invention, the machines can produce relief-type reproductions from and in accordance with ordinary three-dimensional patterns. The attachment thus makes the machine more versatile than before.

It is to be noted that the guides of the pattern tracer stylus and the cutting tool already present on the existing machine are also utilized for the attachment of the invention, so that the attachment is greatly simplified in its construction and is relatively inexpensive to manufacture.

In a modified form of the invention, at least one of the edges of the lever arm and the cantilevered or overhung arm that face each other is provided with a protruding surface curved convexly in the longitudinal direction of the cantilevered arm. Assuming the curved surface is connected to the cantilevered arm, the cantilevered arm is moved up and down as its curved surface rolls on the lever arm as the tracer moves up and down on the pattern. The supporting point on the lever arm for the overhung arm has infinitely varied spacings from the ends of the lever arm, and thus the reduction in the vertical axis dimensions is infinitely varied in such a manner that the lower portions of the vertical dimensions of the pattern which normally represent the background are reduced to a greater extent than the upper portions of the pattern—a rule which is often employed by an artist creating a relief in a freehand fashion, for emphasizing the foreground.

The curvature itself can be of a circular cross section or can be formed in accordance with other geometrical laws, for example, as an involute. The protruding curved surface is suitably displaceable in the longitudinal direction along the bottom of the cantilevered arm in the same manner as the protruding pivot bearing in the first form of the invention.

In a copying machine with a pantograph carrying a cutting tool and the axially movable tracer, as the tracer moves across the pattern moving up and down with the changes in the vertical contour dimensions of the pattern, the attachment of the invention, instead of transferring these movements in a 1:1 ratio to the pantograph and cutting tool, proportionately reduces these movements according to a selected one of several reduction ratios, and thus transfers reduced vertical dimension movements to the pantograph and cutting tool which causes the tool to cut a workpiece in the style of a relief with greatly shortened vertical axis dimensions from the corresponding dimensions on the pattern, while the X- and Z-coordinate dimensions are transferred from the pattern to the workpiece uneffected by the attachment.

BRIEF DESCRIPTION OF THE DRAWINGS

In the drawings, in which the embodiments of the invention are illustrated.

DESCRIPTION OF THE PREFERRED EMBODIMENTS

Figure 1:
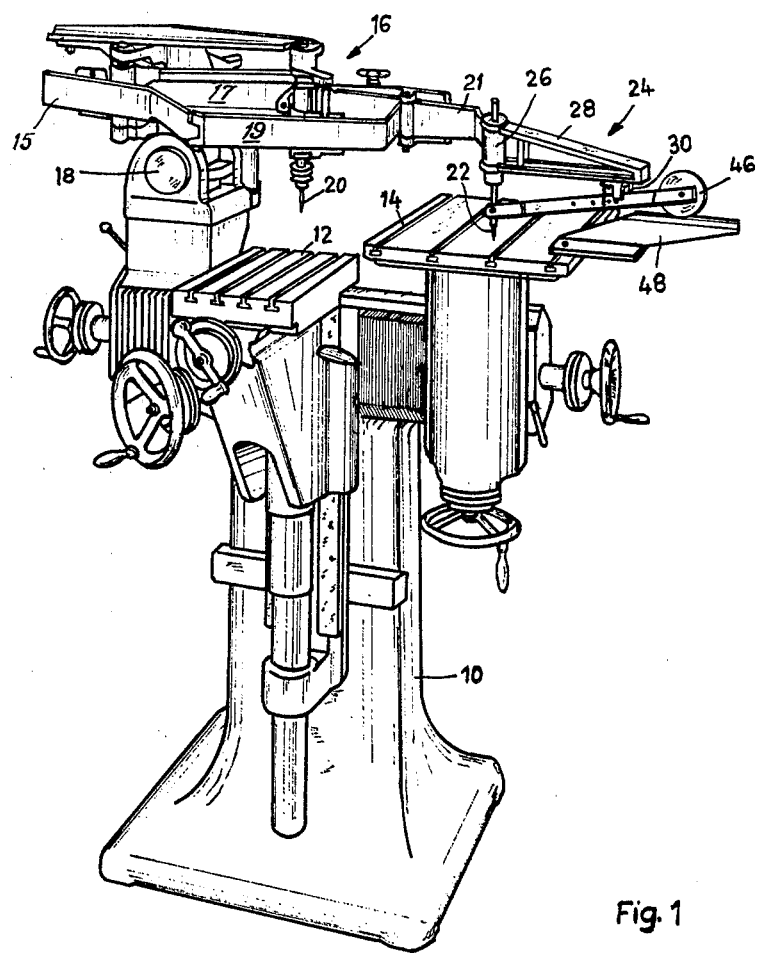
FIG. 1 is a perspective view of an engraving and profiling machine provided with the device of the invention.

The engraving and profiling machine, shown in FIG. 1, is a standard well-known-type of duplicating or copying milling machine, and is basically comprised of a machine stand 10, a worktable 12 connected on stand 10 for movement relative thereto by appropriate hand wheels or the like for supporting the workpiece (not shown), a pattern holding table 14 adapted to support a three-dimensional pattern, and a pantograph 16. The pantograph 16 consists of the articulated members 15, 17, 19, 21 connected in the usual manner and pivotally connected to the machine by horizontal pivot axis 18. The pantograph carries a cutting tool 20, such as a rotating milling tool, driven by a motor drive linkage, or the like, which is not shown since it is of conventional form. The pantograph also carries a tracing stylus 22 which is adapted to trace over the surface of a three-dimensional pattern (not shown) mounted on the table 14. As the tracer 22 moves in the X- and Z-coordinate directions over a three-dimensional pattern the articulated pantograph respectively moves the cutting tool 20 in the same direction, and as the tracer 22 moves in the vertical or Y-coordinate direction over the pattern the pantograph pivots about 18 to also respectively move tool 20 in the Y-coordinate direction. The machine described to this point is a conventional duplicating milling machine, by means of which copies of patterns are produced in the conventional way, and wherein the copying scale, that is the scale between the pattern on table 14 and the copy produced from a workpiece on table 12, can be varied by different settings of the pantograph, in the conventional manner.

Figure 2:
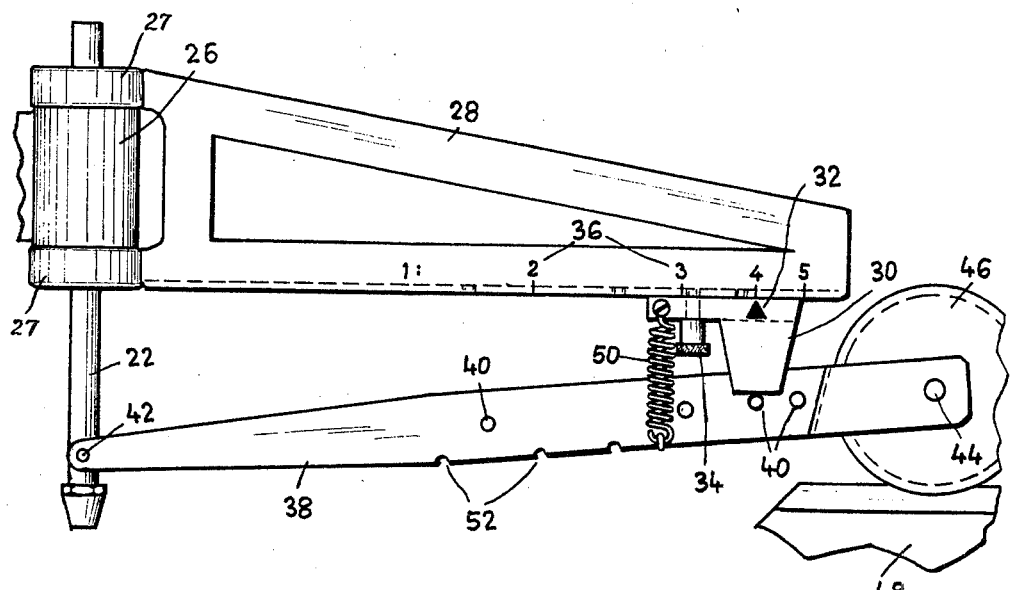
FIG. 2 is a side elevational view on an enlarged scale, of a fragmentary portion of FIG. 1, showing the attachment of the invention.
Figure 3:
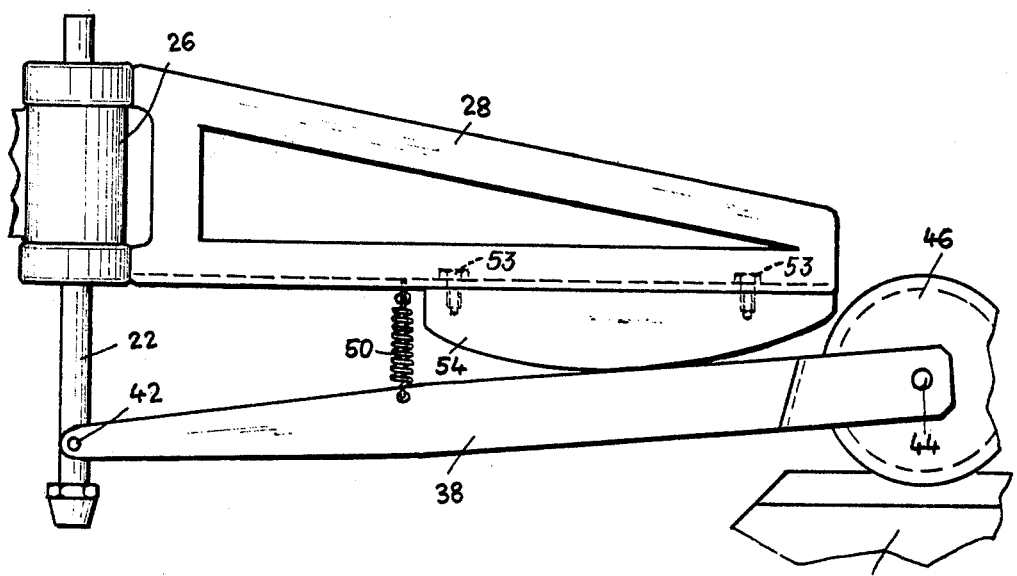
FIG. 3 is a side view, similar to FIG. 2, but showing a modified form of the attachment device of the invention.

In order to produce a workpiece in the form of a relief on a surrounding plane surface, from a three-dimensional pattern or model, an attachment device 24, according to the invention and as shown in FIGS. 2 and 3, is added to the duplicating machine by connecting the attachment of the invention to the pantograph at the place of connection of and as a substitute for the usual fixed tracer. The attachment is adapted for use with all types of copying machines and it is connected to the tracing stylus bushing 26 of the machine. A cantilevered or overhung arm 28 is pivotably mounted on tracing stylus bushing 26 by means of two apertured journals 27 which straddle the opposite ends of the bushing. The tracing stylus 22 extends through bushing 26 and journals 27 and is connected so that it can be axially displaced in its bushing. That is, as shown in FIG. 2 the tracer can move up and down in the vertical plane as it traces over the changing contour of a three-dimensional pattern.

As shown in FIG. 2, the arm 28 is provided with an index scale 36 along its lower edge, which indicates the reduction ratio which is set in the attachment for transfer of the vertical movements of tracer stylus 22 in its bushing or bearing 26, to the bushing and thus the pantograph and cutting tool carried thereby. A pivot bearing member 30, provided with an index mark 32, is selectively connectable at different longitudinal positions along the bottom of arm 28 by means of a screw 34. The different positions to which member 30 are movable are at respectively different distances from the tracer 22 and correspond to different reduction ratios for the tracer pickup.

The pivot bearing member 30, as will be explained, forms a fulcrum for lever arm 38 positioned therebeneath. The medial portion of the lever arm is provided with several cross pins 40 extending therethrough and protruding from opposite sides of the lever, at predetermined points along the length of the arm corresponding to the different positions to which fulcrum member 30 can be adjusted on cantilevered arm 28. Fulcrum member 30 is bifurcated downwardly such that the lower edges of this member straddle the top of lever 38 and rest on a selected one of the cross pins 40 that corresponds to the position of member 30 on arm 28, to thus form a pivot connection between members 38 and 28. The lower edge of lever arm 38 is provided with a plurality of spaced notches 52 corresponding to the cross pins 40, and a spring 50, connected to pivot bearing or fulcrum member 30, has its opposite end retained in one of the notches 52 corresponding to the pin 40 in contact with member 30 to securely support the projecting fulcrum member 30 on the selected cross pin 40.

One end of lever 38 is pivotally connected to the tracing stylus 22 by means of a pivot pin 42, and the opposite end of lever 38 is provided with a roller 46 journaled thereon for rotation by pin 44. Roller 46 is similar to a pulley wheel and has a recessed groove in its peripheral surface which engages over and is guided by the top of a rail 48 which is connected to the pattern holding table 14, as shown in FIG. 1. As previously indicated, rail 48 defines a horizontal plane that is normal to the axis of the tracing stylus and which is disposed at a predetermined fixed position relative to the pattern on the pattern holding table 14. The rail 48 thus forms a guide for movement of roller 46 along this plane at a fixed height relative to the pattern or three-dimensional model over which tracer 22 is moved.

It can readily be appreciated that as tracer 22 moves up and down in the vertical plane as it is moved over the varying contour, in the vertical plane, of the three-dimensional pattern, these vertical movements are transferred to the tracer bushing 26 through lever 38, pivot member 30, and cantilevered arm 28, in a reduced amount predetermined by the position of member 30, along the scale of arm 28, as is required for the conversion of a three-dimensional pattern of a relief. The position of roller 46 is fixed in a horizontal plane and by varying the fulcrum transfer point 30,40 along lever 38 the variation in the vertical axis movements of tracer 22, which represent the vertical dimensions picked from the pattern, are shortened or reduced to a greater or lesser extent when transferred to arm 28 and bushing 26. All movements transferred to bushing 26 result in movement of the cutting tool 20, such as through the pantograph pivoting in the vertical plane about axis 18, so that the vertical movement of the tool as it cuts a relief in the workpiece is greatly reduced from the corresponding vertical movement sensed by the tracer 22 for the corresponding vertical dimension on the pattern. The attachment of the invention thus causes a reduction in the Y-coordinate dimensions sensed by the tracer, but it in no way effects the X- and Z-coordinate dimensions sensed by the tracer which are transferred from the pattern to the cutting tool by operation of the pantograph in the usual manner.

In the modified form of the invention shown in FIG. 3, in place of the pivot bearing projection member 30 on arm 28 and the cross pins 40 on lever 38 which contact each other to form a pivot connection, a cam fulcrum surface 54, of convex curvature, is provided on the underside of arm 28 with the surface 54 facing downwardly and positioned in bearing contact with the upper surface of lever arm 38. A spring 50 connected between cantilevered arm 28 and lever arm 38 maintain the two surfaces in contact. The cam surface 54 is connected to the lower surface of arm 28 by means of screws 53, and can be displaced along the bottom of the arm to various positions (not shown) at different distances from the axis of tracer 22. The remainder of the attachment construction is the same as in the preferred form of the attachment.

With this modified construction, the deeper the location of the traced portions of the pattern picked up by tracer 22, the further downwardly lever arm 38 is moved by tracer 22, and the closer the contact point between the top surface of lever arm 38 and cam surface 54 moves toward the journal pin 44 on arm 38. This corresponds to a continuous increase of the degree of reduction of the vertical dimensions.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. An attachment for a duplicating milling machine of the type having support means for carrying a workpiece and a three-dimensional pattern, and transmission means carrying a cutting tool and a pattern tracer in a tracer bushing with the axes of each being substantially parallel, the transmission means being responsive to movement of the pattern tracer over the pattern to respectively move the cutting tool into contact with the workpiece, comprising a pattern tracer stylus being receivable in the tracer bushing of the duplicating machine and being axially slidable therein, a cantilevered arm having means adapting it for connection to the tracer bushing and extending away from the tracer bushing, a lever member, pivot means pivotally connecting the cantilevered arm and the medial portion of said lever member, means defining a guide plane disposed normal to the axis of the pattern tracer stylus and disposed at a predetermined fixed position relative to the three-dimensional pattern, one end of said lever member pivotally connected to the pattern tracer stylus, and the opposite end of said lever member connected in guiding relation with said means defining a guide plane, whereby the transmission ratio of the relative motions of the pattern tracer stylus with respect to a three-dimensional pattern in the direction of the tracer stylus axis and of the cutting tool with respect to the workpiece in the direction of the cutting tool axis is reduced and different from the transmission ratio from the tracer stylus to the cutting tool of the relative motions in the planes normal to the tracer stylus axis to produce reliefs on the workpiece in accordance with the three-dimensional pattern.

2. An attachment as set forth in claim 1 in which said pivot means includes plural alternately usable support members at varying spacings along the medial portion of said lever member, and a pivot bearing connected to said cantilevered arm and in contact with a selected support member.

3. An attachment as set forth in claim 2 in which said pivot bearing is selectively movable to one of several positions along the length of said cantilevered arm to change the transmission ratio from the tracer stylus to the tracer bushing, and releasable means for securing said pivot means in a selected position on said arm.

4. An attachment as set forth in claim 1 including spring means operatively connected between said cantilevered arm and said lever member for maintaining the pivot connection of said pivot means.

5. An attachment as set forth in claim 3 including a reduction scale on said cantilevered arm adjacent said movable pivot bearing and defining the said several positions, and an index mark on said pivot bearing adapted for registration with said reduction scale.

6. An attachment as set forth in claim 1 in which said means defining a guide plane is a rail member having means adapting it for connection to the support means carrying the three-dimensional pattern, and roller means connected on said opposite end of said lever member and disposed in guiding contact with said rail member.

7. An attachment as set forth in claim 1 in which said cantilevered arm means adapts said cantilevered arm for pivotal connection with the tracer bushing to pivot about the tracer stylus axis.

8. An attachment as set forth in claim 1 in which said pivot means comprises a surface curved convexly with respect to the longitudinal axes of the cantilevered arm and lever member.

9. An attachment as set forth in claim 8 in which said convex surface depends from and curves outwardly from said cantilevered arm.

10. An attachment as set forth in claim 9 in which said convex surface is movable longitudinally of said cantilevered arm to selected positions along the length thereof.